United States Patent
Maurer et al.

(10) Patent No.: US 11,669,980 B2
(45) Date of Patent: Jun. 6, 2023

(54) OPTICAL FLOW BASED MOTION DETECTION

(71) Applicant: Waymo LLC, Mountain View, CA (US)

(72) Inventors: Daniel Rudolf Maurer, Mountain View, CA (US); Alper Ayvaci, Santa Clara, CA (US); Nichola Abdo, Mountain View, CA (US); Christopher John Sweeney, San Francisco, CA (US); Robert William Anderson, Seattle, WA (US)

(73) Assignee: Waymo LLC, Mountain View, CA (US)

( * ) Notice: Subject to any disclaimer, the term of this patent is extended or adjusted under 35 U.S.C. 154(b) by 132 days.

(21) Appl. No.: 17/384,654

(22) Filed: Jul. 23, 2021

(65) Prior Publication Data

US 2023/0033989 A1    Feb. 2, 2023

(51) Int. Cl.
*G06T 7/269* (2017.01)
*G06T 7/246* (2017.01)

(52) U.S. Cl.
CPC .............. *G06T 7/269* (2017.01); *G06T 7/248* (2017.01); *G06T 2207/10028* (2013.01); *G06T 2207/20084* (2013.01); *G06T 2207/30261* (2013.01)

(58) Field of Classification Search
CPC .............. G06T 7/20; G06T 7/215–251; G06T 7/262–285; G06T 2207/20081; G06T 2207/20084; G06T 2207/10028; G06T 2207/30248; G06T 2207/30252; G06T 2207/30261
See application file for complete search history.

(56) References Cited

U.S. PATENT DOCUMENTS

| | | | |
|---|---|---|---|
| 10,552,979 B2 | 2/2020 | Zhu et al. | |
| 2018/0322640 A1* | 11/2018 | Kim | ................ G06V 20/58 |
| 2022/0044424 A1* | 2/2022 | Jayaraman | .............. G06T 7/579 |

OTHER PUBLICATIONS

Rashed, Hazem, et al. "Fusemodnet: Real-time camera and lidar based moving object detection for robust low-light autonomous driving." Proceedings of the IEEE/CVF International Conference on Computer Vision Workshops. 2019. (Year: 2019).*

(Continued)

*Primary Examiner* — Geoffrey E Summers
(74) *Attorney, Agent, or Firm* — Fish & Richardson P.C.

(57) ABSTRACT

Methods, systems, and apparatus, including computer programs encoded on a computer storage medium, for generating motion detection based on optical flow. One of the methods includes obtaining a first image of a scene in an environment taken by an agent at a first time point and a second image of the scene at a second later time point. A point cloud characterizing the scene in the environment is obtained. A predicted optical flow is determined between the first image and the second image. A respective initial flow prediction for the point that represents motion of the point between the two time points is determined. A respective ego motion flow estimate for the point that represents a motion of the point induced by ego motion of the agent is determined. A respective motion prediction that indicates whether the point was static or in motion between the two time points is determined.

20 Claims, 3 Drawing Sheets

(56) References Cited

OTHER PUBLICATIONS

Yuan, Jianying, et al. "Independent moving object detection based on a vehicle mounted binocular camera." IEEE Sensors Journal 21.10 (2020): 11522-11531. (Year: 2021).*

Dosovitskiy el al., "FlowNet: Learning optical flow with convolutional networks," Proceedings of the IEEE International Conference on Computer Vision, 2015, pp. 2758-2766.

Huang et al., "An Efficient Optical Flow Based Motion Detection Method for Non-stationary Scenes," 2019 Chinese Control and Decision Conference, Jun. 2019, 6 pages.

Jonschkowski et al., "What matters in unsupervised optical flow," European Conference on Computer Vision, Nov. 2020, pp. 557-572.

Lucas et al., "An iterative image registration technique with an application to stereo vision," Proceedings DARPA Image Understanding Workshop, Apr. 1981, pp. 121-130.

Rashed et al., "FuseMODNet: Real-Time Camera and LiDAR based Moving Object Detection for robust low-light Autonomous Driving," Proceedings of the IEEE/CVF International Conference on Computer Vision Workshops, 2019, 10 pages.

* cited by examiner

Obtain a first image of a scene in an environment taken by an agent at a first time point and a second image of the scene in the environment taken by the agent at a second later time point
302

Obtain a point cloud characterizing the scene in the environment, the point cloud including a plurality of points
304

Determine, from the first image and the second image, a predicted optical flow between the first image and the second image
306

Determine, for each of the plurality of points from the point cloud and from the predicted optical flow between the first and second images, a respective initial flow prediction for the point that represents motion of the point between the first time point and the second time point
308

Determine, for each of the plurality of points from the point cloud, a respective ego motion flow estimate for the point that represents a motion of the point between the first and second time points that is induced by ego motion of the agent between the first and second time points
310

Determine, for each of the plurality of points from the point cloud and from the respective initial flow predictions for the plurality of points and the respective ego motion flow estimates for the plurality of points, a respective motion prediction that indicates whether the point was static or in motion between the first time point and the second time point
312

FIG. 3    ⬉—300

OPTICAL FLOW BASED MOTION DETECTION

BACKGROUND

This specification relates to motion detection performed by an agent travelling in an environment.

The agent can be a robot, or an autonomous or semi-autonomous vehicle, such as a self-driving car, boat, and aircraft. The agent can use a variety of on-board sensors and computer systems to detect nearby objects and use such detections to make control and navigation decisions.

Some agents can have on-board computer systems that implement neural networks, other types of machine learning models, or both for various prediction tasks, e.g., object classification within images. For example, a neural network can be used to determine that an image captured by an on-board camera is likely to be an image of a nearby car.

Motion estimations of nearby objects can indicate whether a nearby object is static or in motion. The agent can use such motion estimations to perform tasks that assist in control and navigation, such as object segmentation, object tracking, semantic analysis, and so on.

Optical flow depicts the motion of pixels between one image of the scene at a first time and another image of the scene at a later time. Optical flow is defined as the estimated two-dimensional velocities for the corresponding pixels in the two images. Optical flow can depict relative motion between the agent and the scene. When the agent is moving or travelling in the environment, optical flow predictions on a moving object depict motion due to the movement of the agent and the movement of the object in the scene.

SUMMARY

This specification describes systems and techniques for motion detection performed by an agent based on optical flow estimated from camera images. In particular, the systems and techniques use camera based motion information, i.e., the optical flow, and a lidar based ego motion information, i.e., flow due to the motion of the camera, to identify moving and stationary points in the scene of an environment.

In general, one innovative aspect of the subject matter described in this specification can be embodied in methods that include the actions of obtaining a first image of a scene in an environment taken by an agent at a first time point and a second image of the scene in the environment taken by the agent at a second later time point; obtaining a point cloud characterizing the scene in the environment, the point cloud including a plurality of points; determining, from the first image and the second image, a predicted optical flow between the first image and the second image; determining, for each of the plurality of points from the point cloud and from the predicted optical flow between the first and second images, a respective initial flow prediction for the point that represents motion of the point between the first time point and the second time point; determining, for each of the plurality of points from the point cloud, a respective ego motion flow estimate for the point that represents a motion of the point between the first and second time points that is induced by ego motion of the agent between the first and second time points; and determining, for each of the plurality of points from the point cloud and from the respective initial flow predictions for the plurality of points and the respective ego motion flow estimates for the plurality of points, a respective motion prediction that indicates whether the point was static or in motion between the first time point and the second time point. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The predicted optical flow can include a plurality of predicted velocity vectors at a plurality of pixels, and wherein each velocity vector represents motion of corresponding pixels between the first image at the first time point and the second image at the second later time point. Determining, from the first image and the second image, the predicted optical flow between the first image and the second image includes generating, from the first image and the second image, the predicted optical flow using a neural network. Determining, for each of the plurality of points from the point cloud and from the predicted optical flow between the first and second images, the respective initial flow prediction includes: projecting the point from the point cloud onto a corresponding pixel in the predicted optical flow; and assigning the predicted optical flow at the corresponding pixel to the initial flow prediction of the point from the point cloud. Determining, for each of the plurality of points from the point cloud, the respective ego motion flow estimate includes: projecting the point from the point cloud onto a first corresponding pixel in the first image; projecting the point from the point cloud onto a second corresponding pixel in the second image; and determining the ego motion flow estimate of the point by subtracting a position of the first corresponding pixel from a position of the second corresponding pixel. Determining, for each of the plurality of points from the point cloud and from the respective initial flow predictions for the plurality of points and the respective ego motion flow estimates for the plurality of points, the respective motion prediction includes: generating respective final flow predictions for the plurality of points based at least on the initial flow prediction and the ego motion flow estimate. Generating the respective final flow predictions for the plurality of points includes calculating, for each point, a difference between the initial flow prediction and the ego motion flow estimate. The actions further include determining, for each of the plurality of points from the point cloud, the respective motion prediction based at least on the respective final flow predictions for the plurality of points. Determining, for each of the plurality of points from the point cloud and from the respective initial flow predictions for the plurality of points and the respective ego motion flow estimates for the plurality of points, the respective motion prediction of the point includes generating the respective motion prediction of the point using a neural network. The actions further include generating, from the respective motion predictions for each of the plurality of points from the point cloud, a respective object motion prediction for each of one or more objects in the scene. Generating, from the respective motion predictions, the respective object motion prediction for each of the one or more objects in the scene includes: mapping the respective motion predictions for each of the plurality of points from the point cloud into a plurality of clusters, wherein each cluster includes a plurality of points that were in motion between the first time point and the second time point; and generating, based at least on the plurality of clusters, the respective object motion prediction for each of the one or more objects in the scene.

Particular embodiments of the subject matter described in this specification can be implemented so as to realize one or more of the following advantages.

The systems and techniques can generate low level motion predictions for a plurality of points in a scene. The low level per point motion predictions can provide rich information that can be used to perform a variety of tasks, e.g., segmentation, tracking, semantics analysis, navigation, planning, and so on. Furthermore, the low level per point motion predictions are object agnostic and do not need to specify a particular object that the point belongs to. The object agnostic nature of the per point motion prediction can be highly beneficial in analyzing challenging cases, such as edge cases or long tail cases. Examples of long tail cases can include a scene of one or more uncommon objects that suddenly appear in the scene, e.g., a child's toy appearing between parked cars or falling outside the car's window, people carrying large objects that occluded a significant portion of their body, e.g., a pedestrian carrying a picture frame, a piece of plywood, a piece of furniture, and so on.

The systems and techniques can accurately predict moving and stationary points in the scene based on both the optical flow estimated from camera images and the motion of the camera measured by a lidar point cloud. The systems and techniques can accurately predict moving and stationary points in the scene for occluded objects, e.g., occluded pedestrians carrying a large object.

The systems and techniques take into account the fact that the agent can be moving while capturing the sensor data that depicts the scene. For example, an autonomous vehicle can be travelling in the environment while capturing the camera images and the lidar point clouds. Because the estimated optical flow captures the motion due to the movement of the camera and the motion due to the movement of the objects in the scene, the system can first compute the optical flow prediction and then subtract the motion due to camera motion from the optical flow prediction.

The per point motion predictions can be mapped to clusters to generate motion estimations for one or more objects in the scene. The per point motion predictions or the clusters can be used as additional inputs to a motion classification system to improve the motion classification result for one or more objects in the scene.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes optical flow based motion detection performed by an agent travelling in an environment. The agent can be a robot, a drone, an autonomous vehicle, or any other agent.

Figure 1:
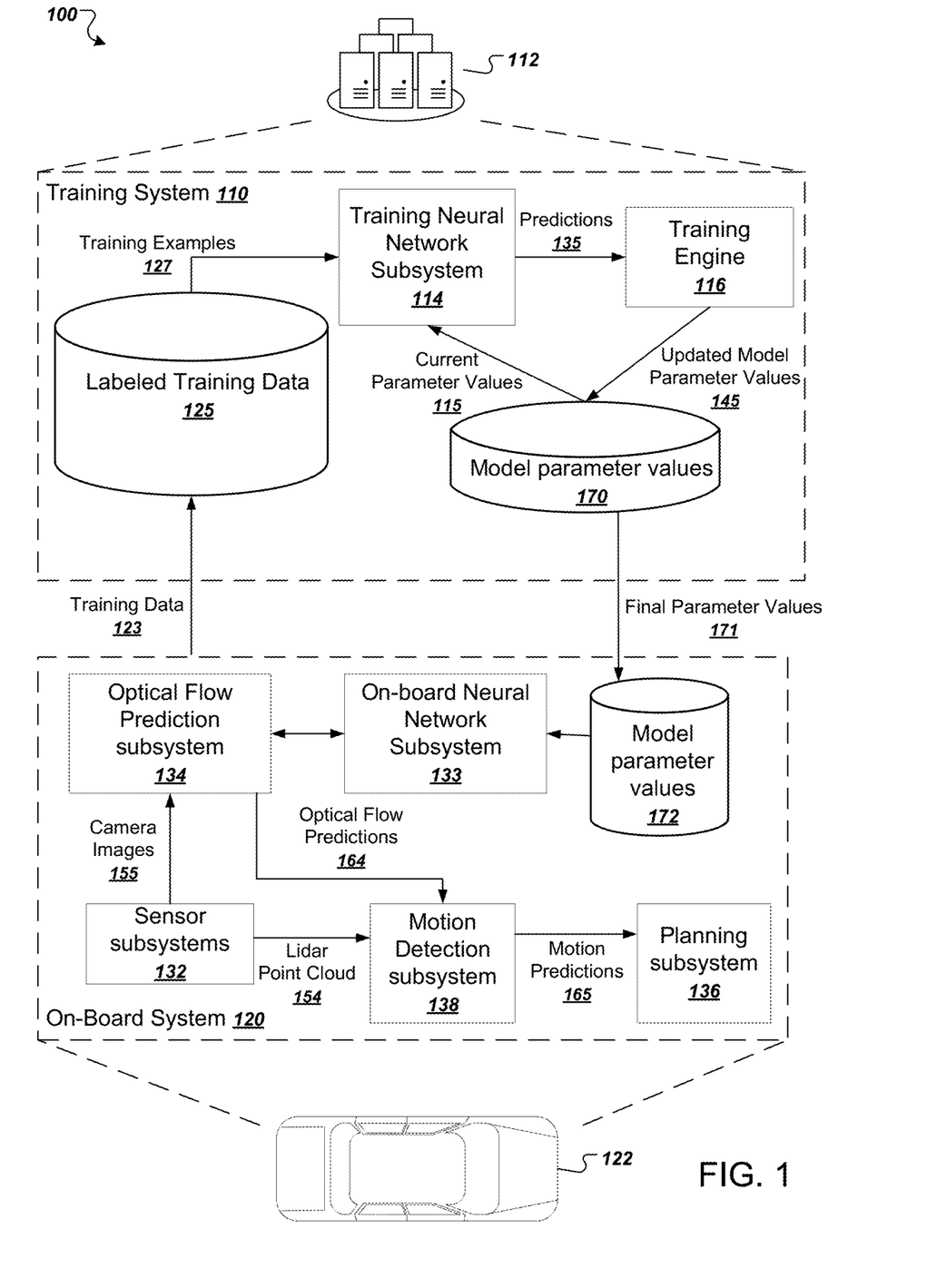
FIG. 1 is a diagram of an example system.

FIG. 1 is a diagram of an example system 100. The system 100 includes a training system 110 and an on-board system 120 located on-board a vehicle 122. Although the agent is illustrated as a vehicle 122, the systems and techniques discussed here can be applied to other types of agent, such as a robot, a drone, an airplane, an autonomous vehicle, a semi-autonomous vehicle, and so on.

The on-board system 120 is physically located on-board the vehicle 122. Being on-board the vehicle 122 means that the on-board system 120 includes components that travel along with the vehicle 122, e.g., power supplies, computing hardware, and sensors.

The vehicle 122 can be a fully autonomous vehicle that uses motion predictions 165 to inform fully-autonomous driving decisions. The vehicle 122 can also be a semi-autonomous vehicle that uses motion predictions 165 to aid a human driver. For example, the vehicle 122 can autonomously apply the brakes if a motion prediction result indicates that a human driver is about to get close to a pedestrian crossing the roadway.

The on-board system 120 includes one or more sensor subsystems 132. The sensor subsystems include a combination of components that receive reflections of electromagnetic radiation, e.g., lidar systems that detect reflections of laser light, radar systems that detect reflections of radio waves, and camera systems that detect reflections of visible light, and so on. More specifically, a laser sensor or other sensor can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight. For example, a camera can capture an image or a video of a scene that includes one or more cars travelling on the road, and the condition of the road. As another example, lidar sensors can capture point cloud data that depicts a scene of the road.

The sensor subsystems 132 provide camera images 155 to an optical flow prediction subsystem 134 that can generate optical flow predictions 164 based on the input camera images 155. The camera images 155 can include a first image of a scene in an environment taken by an agent at a first time point and a second image of the scene in the environment taken by the agent at a second, later time point. The two camera images 155 can be taken subsequently in time. For example, the camera images 155 can include a first image of a road taken by the vehicle 122 at a first time point t while the vehicle is travelling on the road, and a second image of the road taken by the vehicle 122 at a second time point t+1, e.g., 0.05 second after the time point t, or 0.1 second after the time point t. The camera images 155 can depict the motion of the objects in the scene relative to the agent.

The optical flow predictions 164 is a predicted optical flow between the first camera image and the second camera image. In general, the optical flow between a first image and a second image captured at a second different time point is defined as data that includes, for each pixel in the first image, the estimated two-dimensional velocity for the pixel between the first image and the second image captured at the second, different time point. For example, the optical flow can be data that includes, for each pixel in the first image, a motion vector from one pixel in one image of the scene at a first time to a corresponding pixel in another image of the scene at a later time. The optical flow predictions 164 can depict relative motion between the agent and the scene.

The optical flow prediction subsystem 134 can generate the optical flow predictions 164 using any suitable optical flow algorithms. Examples of optical flow algorithms include differential algorithms, e.g., the Lucas-Kanade algorithm (Lucas, Bruce D., and Takeo Kanade. "*An iterative image registration technique with an application to stereo vision.*" 1981), feature matching algorithms, and so on.

In some implementations, the optical flow prediction subsystem 134 can use a neural network that has been previously trained to generate the optical flow prediction 164 based on input camera images 155. Examples of the neural network include the Flownet neural network model (Dosovitskiy, Alexey, et al. "*Flownet: Learning optical flow with convolutional networks.*" Proceedings of the IEEE international conference on computer vision. 2015), the UFlow neural network model (Jonschkowski, Rico, et al. "*What matters in unsupervised optical flow.*" arXiv preprint arXiv:2006.04902 1.2 (2020): 3), and so on. The optical flow prediction subsystem 134 can use an on-board neural network subsystem 133 to implement the operations of a neural network model that has been trained to make the optical flow predictions. Thus, the on-board neural network subsystem 133 includes one or more computing devices having software or hardware modules that implement the respective operations of a neural network model according to the configuration of the neural network model.

The sensor subsystems 132 provide a lidar point cloud 154 to a motion detection subsystem 138. The lidar point cloud 154 includes a plurality of points that characterize distances from the lidar sensors to the objects in the scene of the environment. The motion detection subsystem 138 takes the optical flow predictions 164 and the lidar point cloud 154 as inputs, and generates the motion predictions 165.

In some implementations, the motion detection subsystem 138 can generate, from the per point motion predictions 165, a respective object motion prediction for each of one or more objects in the scene. In some implementations, the motion detection subsystem 138 can map the per point motion predictions into a plurality of clusters, and each cluster can include a plurality of nearby points that were in motion. The subsystem can then generate, based on the clusters, the respective object motion prediction for each of the one or more objects in the scene. More details of motion detection based on optical flow are described below with reference to FIG. 2.

The motion detection subsystem 138 can provide the motion predictions 165 for the points in the point cloud to a planning subsystem 136. When the planning subsystem 136 receives the motion predictions 165 for the points in the point cloud, the planning subsystem 136 can use the motion predictions 165 to make control and navigation decisions for the agent, e.g., making fully-autonomous or semi-autonomous driving decisions for the vehicle 122. For example, the planning subsystem 136 can determine, based on the per point motion predictions 165, that a pedestrian who is carrying a large object is crossing the road, and in response, the autonomous vehicle can slow down and yield to the pedestrian. As another example, based on the per point motion predictions 165, the planning system can perform more accurate tracking of another vehicle that is travelling in front of the agent.

The on-board system 120 can also use the sensor data, e.g., the camera image 155 or the lidar point cloud 154, generated from the sensor subsystem 132 to generate training data 123. The on-board system 120 can provide the training data 123 to the training system 110 in offline batches or in an online fashion, e.g., continually whenever it is generated.

The training system 110 is typically hosted within a data center 112, which can be a distributed computing system having hundreds or thousands of computers in one or more locations. The training system 110 includes a neural network training subsystem 114 that can implement the operations of each layer of a neural network that is designed to make predictions from input sensor data, e.g., making optical flow predictions from camera images, generating motion predictions from initial flow predictions and ego motion flow estimates, and so on. The neural network training subsystem 114 includes a plurality of computing devices having software or hardware modules that implement the respective operations of the neural network model according to a configuration of the neural network model.

The neural network model in the training system 110 generally has the same architecture and parameters as the neural network model in the on-board system 120. However, the training system 110 needs not use the same hardware to compute the operations of the neural network model. In other words, the training system 110 can use CPUs only, highly parallelized hardware, or some combination of these.

The neural network training subsystem 114 can compute the operations of the neural network model using current parameter values 115 stored in a collection of model parameter values 170. Although illustrated as being logically separated, the model parameter values 170 and the software or hardware modules performing the operations may actually be located on the same computing device or on the same memory device.

The neural network training subsystem 114 can receive training examples 123 as input. The training examples 123 can include labeled training data 125. For example, each of the training examples 123 can include camera images taken by an agent at a first time point and a second, later time point, as well as a label that indicates the ground truth optical flow at a plurality of pixels in the camera images. As another example, each of the training examples 123 can include initial flow predictions and ego motion flow estimates for a plurality of points, as well as a label that indicates the motion predictions for the plurality of points.

In some implementations, the training neural network subsystem 114 can perform a semi-supervised training, or an unsupervised training of the neural network model using training examples that are not labeled. For example, the training neural network subsystem 114 can perform an unsupervised training of an optical flow prediction neural network, e.g., the UFlow neural network model (Jonschkowski, Rico, et al. "*What matters in unsupervised optical flow.*" arXiv preprint arXiv:2006.04902 1.2 (2020): 3), using training examples that do not have corresponding ground truth optical flow labels.

The neural network training subsystem 114 can generate, for each training example 123, one or more predictions 135.

For example, each prediction 135 represents a predicted optical flow between the first image and the second image. As another example, each prediction 135 represents motion predictions generated from the initial flow predictions and ego motion flow estimates. A training engine 116 analyzes the predictions 135 and compares the predictions to the labels in the training examples 123. The training engine 116 then generates updated model parameter values 145. The training engine 116 can then update the collection of model parameter values 170 using the updated model parameter values 145.

After training is complete, the training system 110 can provide a final set of model parameter values 171 to the on-board system 120 for use in making predictions, e.g., optical flow predictions 164. The training system 110 can provide the final set of model parameter values 171 by a wired or wireless connection to the on-board system 120.

Figure 2:
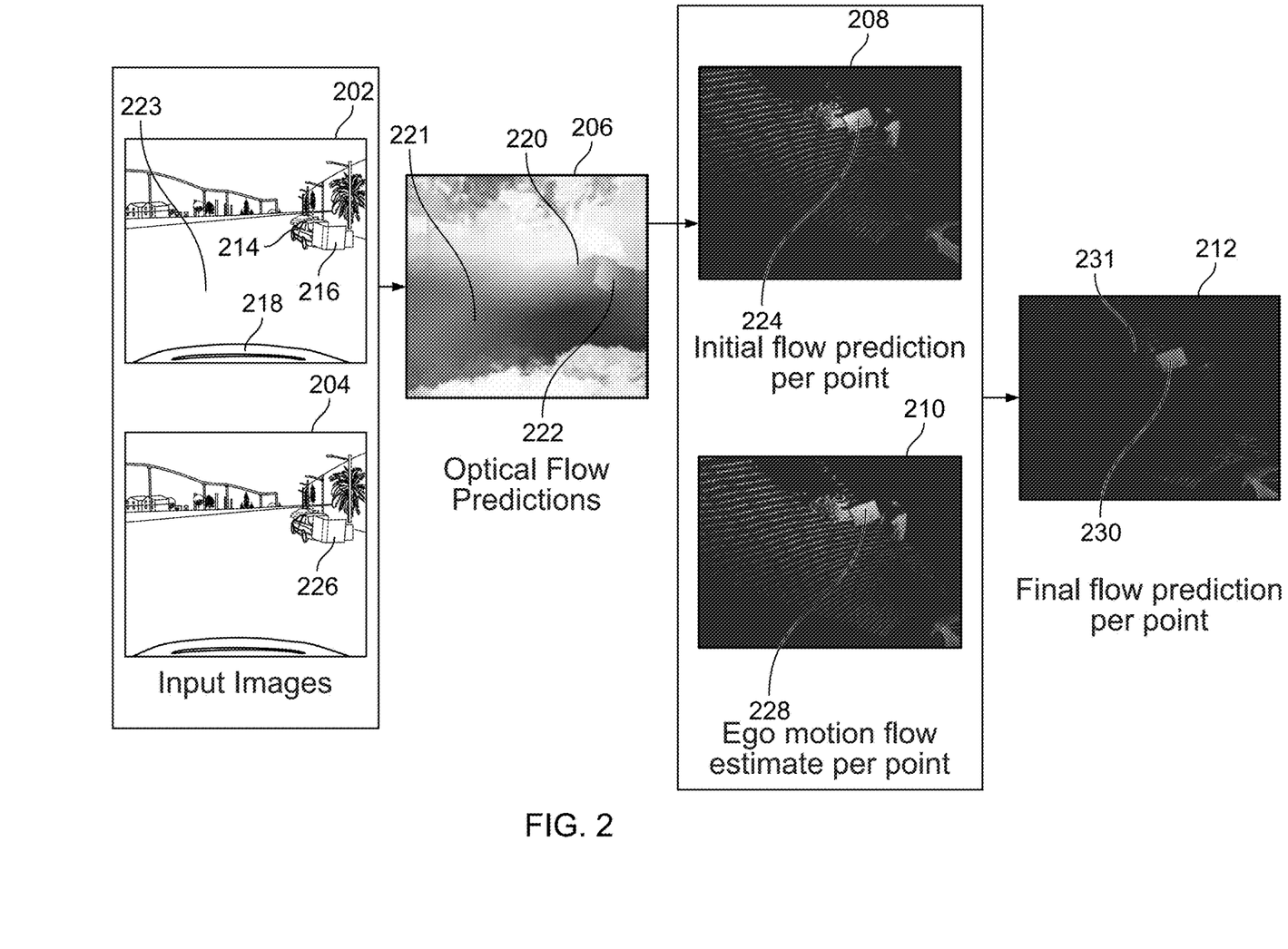
FIG. 2 illustrates an example of generating motion predictions based on optical flow.

FIG. 2 illustrates an example of generating motion predictions based on optical flow. In this example, the agent is a vehicle 218 travelling on the road, and the vehicle 218 can be an autonomous vehicle or semi-autonomous vehicle. The sensor subsystem 132 of the vehicle 218 captures sensor data that depicts a scene of the environment. The input images include two camera images taken from the sensor subsystem 132 by the one or more camera sensors at two time points. The images depict a road in front of the vehicle. A gray car 214 is stationary and is parked on the right lane in front of the vehicle 218. A pedestrian is crossing the road while carrying a large cardboard 216 that occludes the pedestrian.

The image 202 is an image of the road at a first time point t. The image 204 is an image of the road at a second time point t+1. At the first time point, the pedestrian is at a first location while carrying the cardboard 216. At the second time point, the pedestrian moved to a second location while carrying the cardboard 216.

Because the cardboard 216 is a large object that occludes the view of the pedestrian, motion detection methods that are based on lidar data may not detect that the pedestrian is in motion. This is because the lidar point cloud data is based on reflections of laser light measured at sparse locations in the scene, and therefore, the pedestrian emerging from the occlusion may only have a few lidar points on the pedestrian. Because a significant portion of the pedestrian's body is occluded, it is hard for the system to detect the pedestrian in the scene as a pedestrian object and track the position of the pedestrian. It is also hard for the system to track the position of the cardboard because cardboards typically do not move. By contrast, the camera sensors can detect reflections of visible light and the camera images 202 and 204 can depict the scene at a higher resolution than the lidar data. The optical flow prediction generated from the camera images can have a dense flow field and can be used by the system to more easily identify heavily occluded moving objects. The optical flow prediction can help track the motion of the pedestrian because the optical flow prediction is low-level motion data that does not rely on the detection and tracking of an object of a particular object type.

The on-board system 120 generates optical flow predictions 206 from the input images 202 and 204. The optical flow predictions 206 provide a dense, per-pixel mapping from one image to another, e.g., from the first image 202 to the second image 204. The optical flow predictions 206 include a plurality of predicted velocity vectors at a plurality of pixels. Each velocity vector depicts a motion of the corresponding pixel that moves from the location in the first image 202 to the corresponding location in the second image 204. For example, the velocity vector can be $$\left(\frac{\Delta x}{\Delta t}, \frac{\Delta y}{\Delta t}\right),$$

in which $\Delta x$ represents the motion of the pixel in the horizontal direction in the image, $\Delta y$ represents the motion of the pixel in the vertical direction in the image, and $\Delta t$ represents the time difference between the time point t and the time point t+1.

The optical flow predictions 206 depict the per-pixel motion due to the movement of the vehicle 218 and the movement of the object in the scene. The optical flow predictions on the static parts of the scene are caused by the camera's motion from the first time point to the second time point. For example, the optical flow prediction 221 for a pixel on the ground 223 is caused by the camera's motion. As another example, although the car 214 is stationary, because the vehicle 218 is moving, the optical flow predictions 206 for the car 214, e.g., the pixel 220 in the optical flow predictions 206, show that the estimated velocity vector is not zero. As another example, the predicted optical flow at pixel 222 corresponds to a pixel on the cardboard 216. The predicted optical flow at pixel 222 depicts motion due to the movement of the vehicle 218 and the motion due to the movement of the cardboard 216. The predicted optical flow 222 for the corresponding pixel at the cardboard 216 is different from the predicted optical flow 220 at the pixel on the car 214 because the cardboard 216 is in motion and the car 220 is stationary.

The on-board system 120 obtains a lidar point cloud that includes a plurality of points, and the point cloud value at each point is a measurement of the depth of each point in the three-dimensional space from the lidar sensor at the second time point corresponding to the image 204 (or the first time point corresponding to the image 202). The on-board system 120 can compute the motion prediction for the points in the lidar point cloud based on both the optical flow predictions 206 and the lidar point cloud.

Based on the optical flow predictions 206, the on-board system 120 determines a respective initial flow prediction 208 for each of the plurality of points from the point cloud. The initial flow prediction 208 at each point represents the motion of the point between the first time point in image 202 and the second time point in image 204.

In some implementations, the system can project the point from the point cloud onto a corresponding pixel in the optical flow predictions 206. The system can obtain a respective corresponding pixel in the optical flow prediction for each point from the point cloud based on a camera model of the camera sensor, such as the rolling shutter of the camera, the pose or location of the one or more camera sensors, and the pose or location of the one or more lidar sensors, and so on, at the different time steps. The system can then assign the predicted optical flow at the corresponding pixel in the optical flow predictions 206 to the initial flow prediction of the point.

For example, a point in the lidar point cloud depicts the depth information of a location on the cardboard in the image 202. The system can project the point from the point cloud onto a corresponding pixel 222 in the optical flow predictions 206. The system can then obtain the optical flow predictions 206 at the pixel 222, e.g., the predicted velocity vector at the pixel 222. The system can assign the predicted optical flow at the pixel 222 to the initial flow prediction 208 at the point 224 in the point cloud.

In some implementations, the system can project the point from the point cloud onto a corresponding pixel in a camera image that corresponds to the optical flow prediction based on a perspective camera model that takes into account various effects during the image capturing process, e.g., lens distortions and rolling shutter. For example, the system can transform the point from the point cloud from the world coordinate frame into the camera coordinate frame, e.g., using extrinsic calibration. The system can then project the point onto an image plane, e.g., using intrinsic calibration, while taking as input the lens distortion, e.g., using a plurality of distortion coefficients. The system can take as input the rolling shutter and the change in pose during the image capturing process.

In some implementations, the system can project a pixel in the predicted optical flow to a point in the point cloud. For example, the system can store the coordinates of a pixel that has been previously projected to a corresponding point from the point cloud in the point cloud data. The system can read the stored coordinate information of the pixel from the point cloud data and can use that information to project the pixel to the corresponding point in the point cloud.

From the lidar point cloud data that depicts the depth of the points in the point cloud, the on-board system 120 can determine the ego motion flow estimate 210 for the plurality of points in the lidar point cloud. In the field of computer vision, the ego motion refers to the motion of the camera within the environment. The ego motion flow estimate represents a motion of the point between the first time point and the second time point that is induced by the ego motion of the camera installed on the agent, e.g., the vehicle 218, between the first and second time points.

For example, for each of the plurality of points from the point cloud, the system can determine a respective ego motion flow estimate 210 for the point that represents a motion of the point between the first and the second time points that is induced by the ego motion of the vehicle 218 between the first and the second time points.

In some implementations, the system can project the point from the point cloud onto a first corresponding pixel in the first image 202, and the system can project the point from the point cloud onto a second corresponding pixel in the second image 204. The system can determine the ego motion flow estimate of the point by subtracting the position of the first corresponding pixel from the position of the second corresponding pixel.

For example, a point in the lidar point cloud can depict the depth information of a location on the cardboard in the image 202. The system can project the point from the point cloud onto a first corresponding pixel 216 in the first image 202, and the system can project the point from the point cloud onto a second corresponding pixel 226 on the second image 204. The system can determine a vector from the position of the first corresponding pixel 216 to the position of the second corresponding pixel 226, and the vector is the ego motion flow estimate 228 of the point.

From the initial flow predictions 208 and the ego motion flow estimates 210, the on-board system 120 determines a motion prediction for the plurality of points in the point cloud. For each of the plurality of points from the point cloud, the system determines a respective motion prediction that indicates whether the point was static or in motion between the first time point corresponding to the first image 202 and the second time point corresponding to the second image 204.

For example, the system can determine that the initial flow prediction 208 at the point 224 is significantly different from the ego motion flow estimate 210 at the corresponding point 228. The system can determine that the pixel 216 on the cardboard in the first image 202 that corresponds to the point 224 is in motion between the first time point and the second time point.

In some implementations, the system can generate a final flow prediction 212 for the plurality of points based on the initial flow prediction 208 and the ego motion flow estimate 210. For example, for the point on the cardboard, the system can generate a final flow prediction 230 for the point based on the initial flow prediction 224 and the ego motion flow estimate 210.

In some implementations, the system can generate a respective final flow prediction for the plurality of points based at least on the initial flow prediction and the ego motion flow estimate. The final flow prediction can indicate the motion due to the movement of the object in the scene, without the motion due to the movement of the camera, i.e., the ego motion. In some implementations, the system can generate the respective final flow predictions 212 by calculating, for each point, a difference between the initial flow prediction and the ego motion flow estimate.

For example, for a point on the cardboard, because the initial flow prediction 224 measures the motion due to the movement of the cardboard and motion of the vehicle 218, and because the ego motion flow estimate 228 measures the motion of the vehicle 218, the difference between the initial flow prediction 224 and the ego motion flow estimate 228 can be a prediction of the motion due to the movement of the cardboard itself. As shown in image 212 of FIG. 2, the final flow prediction 230 of the point on the cardboard is different from the final flow prediction of the points on the road, and this is because the cardboard has moved between the first and the second time points while the road is stationary. The final flow prediction of the points on the car is similar to the final flow estimates of the points on the road because the car is stationary.

In some implementations, the system determines the respective motion prediction based at least on the respective final flow predictions 212 for the plurality of points. In some implementations, the system can compare the final flow prediction to a flow threshold, and if the final flow prediction is greater than the flow threshold, the system can determine that the point is in motion. If the final flow prediction is less than the flow threshold, the system can determine that the point is static.

In some implementations, the system can compare the magnitude of the velocity vector of a point in the final flow prediction 212 to a threshold. If the magnitude of the velocity vector in the final flow prediction 212 is larger than a threshold, the system can determine that the corresponding point is in motion. If the magnitude of the velocity vector is not larger than a threshold, the system can determine that the corresponding point is stationary.

For example, the system can determine that the point corresponding to the final flow prediction 230 is in motion because the magnitude of the velocity vector of the final flow prediction 230 is larger than the threshold. The system can determine that the point corresponding to the final flow prediction 231 is stationary because the magnitude of the velocity vector of the final flow prediction 231 is less than the threshold.

In some implementations, the threshold depends on the distance from the point to the vehicle 218, i.e., the threshold can be a depth dependent threshold. If the point is closer to the vehicle, the threshold can be a larger value, and if the point is further from the vehicle, the threshold can be a smaller value. In some implementations, the threshold can be a percentage of the magnitude of the ego motion flow estimate. If the magnitude of the final flow at the point is smaller than a predetermined percentage of the magnitude of the ego motion flow at the point, the point is stationary. If the magnitude of the final flow at the point is larger than a predetermined percentage of the magnitude of the ego motion flow at the point, the point is in motion.

In some implementations, the system can generate the motion prediction for the plurality of points in the point cloud using a neural network. In some implementations, the system can train a neural network model that takes the initial flow prediction 208 and the ego motion flow estimate 210 as input and generates the motion prediction as output. In some implementations, the neural network model can generate a predicted likelihood that a point of interest is in motion or stationary by taking as input the initial flow prediction and the ego motion flow estimate at points that are in the neighborhood of the point of interest. For example, the neural network model can take as input the initial flow prediction and the ego motion flow estimate at points that are in a 50 points by 50 points neighborhood surrounding the point of interest, and the neural network model can generate a predicted probability that the point of interest is stationary or in motion.

In some implementations, the neural network can be trained to take as input a final flow prediction 212, which is the difference between the initial flow prediction and the ego motion flow estimates for the plurality of points in the point cloud, and can generate the motion prediction for the plurality of points in the point cloud.

The system can use the on-board neural network subsystem 133 to implement the operations of a neural network model that has been trained to make the motion predictions 165. Thus, the on-board neural network subsystem 133 includes one or more computing devices having software or hardware modules that implement the respective operations of a neural network model according to the configuration of the neural network model.

Figure 3:
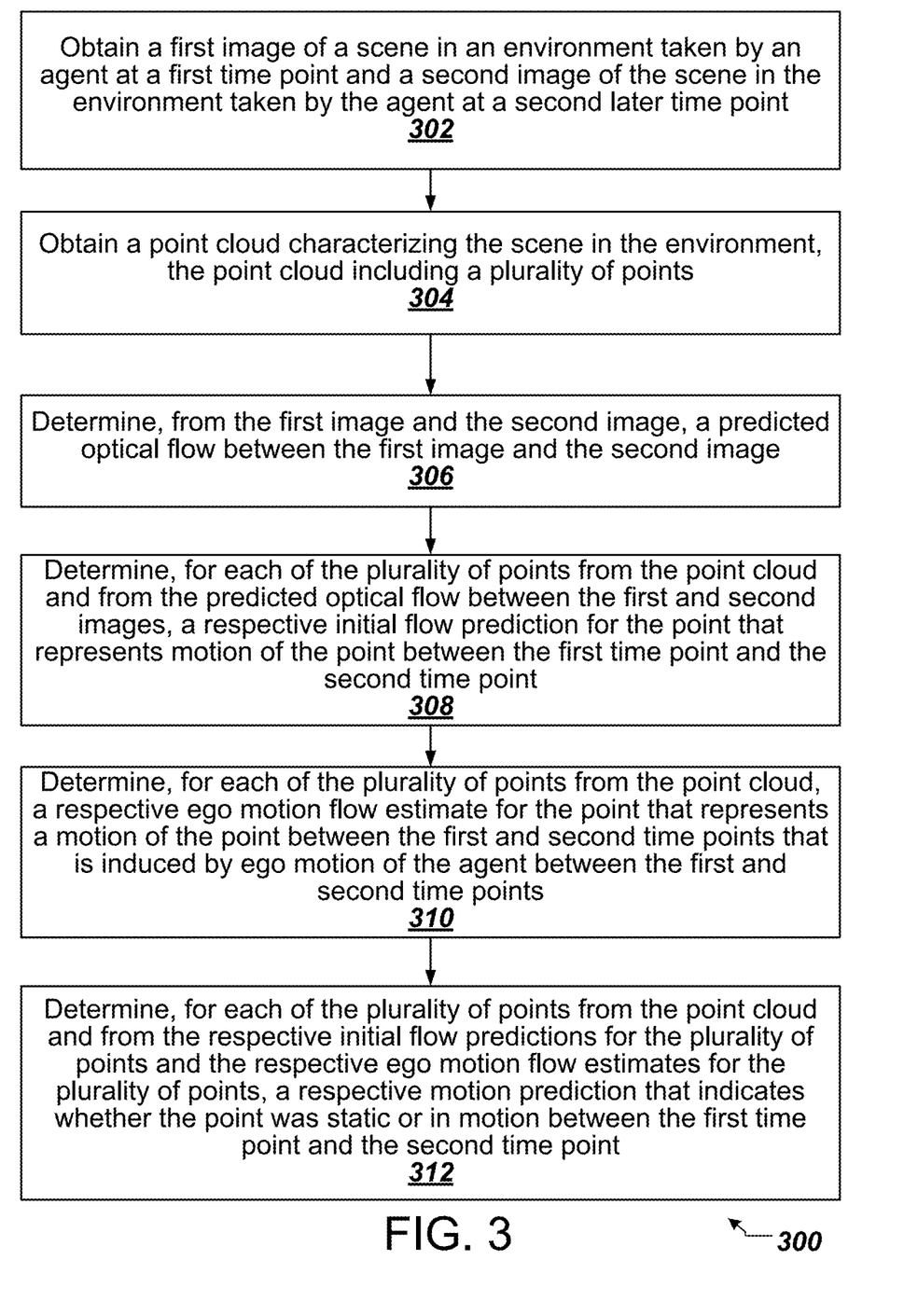
FIG. 3 is a flow chart of an example process for motion detection based on optical flow.

FIG. 3 is a flow chart of an example process 300 for motion detection based on optical flow. The process will be described as being performed by a system of one or more computers in one or more locations, appropriately programmed in accordance with this specification. For example, the system can be an on-board system located on-board an agent, e.g., the on-board system 120 of FIG. 1.

The system obtains a first image of a scene in an environment taken by an agent at a first time point and a second image of the scene in the environment taken by the agent at a second later time point (302). The system obtains a point cloud characterizing the scene in the environment, and the point cloud includes a plurality of points (304).

The system determines, from the first image and the second image, a predicted optical flow between the first image and the second image (306). That is, the system estimates an optical flow between consecutive frames of camera images, which provides a dense, per-pixel mapping from one image to another image. In some implementations, the predicted optical flow can include a plurality of predicted velocity vectors at a plurality of pixels, and each velocity vector can represent the motion of corresponding pixels between the first image at the first time point and the second image at the second later time point.

In some implementations, the system can generate, from the first image and the second image, the predicted optical flow using a neural network. The neural network can be trained on labeled training data using a supervised training method, or a semi-supervised training method. Alternatively or in combination, the neural network can be trained on unlabeled training data using an unsupervised method.

The system determines, for each of the plurality of points from the point cloud and from the predicted optical flow between the first and second images, a respective initial flow prediction for the point that represents motion of the point between the first time point and the second time point (308).

In some implementations, the system can project the point from the point cloud onto a corresponding pixel in the predicted optical flow, and can assign the predicted optical flow at the corresponding pixel to the initial flow prediction of the point from the point cloud. The system can project the point from the point cloud onto a corresponding pixel in the predicted optical flow based on a camera model of the camera sensor, such as the rolling shutter of the camera, the location of the one or more camera sensors, and the location of the one or more lidar sensors. Then, the optical flow value at the pixel can be assigned to the corresponding point in the point cloud. In some implementations, the system can project the optical flow onto the corresponding lidar point cloud data to determine the initial flow predictions.

The system determines, for each of the plurality of points from the point cloud, a respective ego motion flow estimate for the point that represents a motion of the point between the first and second time points that is induced by ego motion of the agent between the first and second time points (310). That is, the system estimates an optical flow due to the motion of the camera or the motion of the car.

In some implementations, the system can project the point from the point cloud onto a first corresponding pixel in the first image, project the point from the point cloud onto a second corresponding pixel in the second image, and determine the ego motion flow estimate of the point by subtracting a position of the first corresponding pixel from a position of the second corresponding pixel.

The system determines, for each of the plurality of points from the point cloud and from the respective initial flow predictions for the plurality of points and the respective ego motion flow estimates for the plurality of points, a respective motion prediction that indicates whether the point was static or in motion between the first time point and the second time point (312). That is, the system determines whether each point is moving or stationary.

For example, if the ego motion flow of a point differs significantly from the initial flow prediction of the point, the point is more likely in motion. If the ego motion flow of a point is substantially similar to the initial flow prediction of the point, the point is more likely stationary.

In some implementations, the respective motion prediction can be a binary value indicating whether each point is in motion or stationary. For example, the motion prediction at the point in point cloud corresponding to the pixel 216 can be TRUE, indicating the point is in motion. In some implementations, the respective motion prediction can be a score indicating a predicted likelihood that the point is in motion. For example, the motion prediction at the point in point cloud corresponding to the pixel 216 can be 0.9, indicating that the probability that the point is in motion is 90%.

In some implementations, the system can generate respective final flow predictions for the plurality of points based at least on the initial flow prediction and the ego motion flow estimate. In some implementations, the system can generate the respective final flow predictions by calculating, for each point, a difference between the initial flow prediction and the ego motion flow estimate. In some implementations, the system can determine, for each of the plurality of points from the point cloud, the respective motion prediction based at least on the respective final flow predictions for the plurality of points. For example, the system can determine the motion prediction of a point by comparing the final flow prediction of the point with a threshold.

In some implementations, the system can generate the respective motion predictions for the plurality of points using a neural network. The neural network can be trained to take the initial flow predictions and the ego motion flow estimates of the points as input and can generate the motion predictions as output. For example, the input to the neural network can be the initial flow predictions and the ego motion flow estimates of the points within a local neighborhood of a desired point of interest from the point cloud, and the output of the neural network can be the motion prediction for the desired point of interest from the point cloud.

In some implementations, the system can generate, from the respective motion predictions for each of the plurality of points from the point cloud, a respective object motion prediction for each of one or more objects in the scene. That is, the system can aggregate per-point motion prediction to object level motion predictions. In some implementations, the system can map the respective motion predictions for each of the plurality of points from the point cloud into a plurality of clusters, and each cluster can include a plurality of points that were in motion between the first time point and the second time point. For example, the system can obtain cluster predictions from another system that can be configured to generate cluster predictions from the motion prediction. As another example, the system can generate the cluster predictions by grouping nearby moving points that move in similar directions and speeds to a cluster. The system can generate, based at least on the features of the plurality of clusters, the respective object motion prediction for each of the one or more objects in the scene.

For example, as shown in FIG. 2, the system can map the motion predictions for the points on the cardboard, e.g., from the final flow prediction at the point 230 and its nearby points, to a cluster because the motion predictions for these points on the cardboard indicate that these points are in motion. The system can generate an object motion prediction for the cardboard that indicates that the cardboard is in motion.

As another example, as shown in FIG. 2, the system can map the motion predictions for the points on the car 214, e.g., from the final flow prediction at the point 231 and its nearby points, to a cluster because the motion predictions for these points on the cardboard indicate that these points are stationary. The system can generate an object motion prediction for the car 214 that indicates that the car is stationary.

In some implementations, after mapping the points to clusters, the system can obtain optical flow features of each cluster, e.g., from the initial flow prediction, the ego motion flow estimate, or from the final flow predictions. The system can use these optical flow features of each cluster as input to a motion state classifier to generate a motion score of the corresponding object in the scene. In some implementations, the motion state classification can take as input other features and signals as input, in addition to the optical flow features of the cluster, to generate the motion score. The motion score can be a binary value indicating a stationary state or in motion state. The motion score can be a likelihood value indicating the likelihood that the object is in motion.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
    obtaining a first image of a scene in an environment taken by an agent at a first time point and a second image of the scene in the environment taken by the agent at a second later time point;
    obtaining a point cloud characterizing the scene in the environment, the point cloud comprising a plurality of points;
    determining, from the first image and the second image, a predicted optical flow between the first image and the second image;
    determining, for each of the plurality of points from the point cloud and from the predicted optical flow between the first and second images, a respective initial flow prediction for the point that represents motion of the point between the first time point and the second time point;
    determining, for each of the plurality of points from the point cloud, a respective ego motion flow estimate for the point that represents a motion of the point between the first and second time points that is induced by ego motion of the agent between the first and second time points; and determining, for each of the plurality of points from the point cloud and from the respective initial flow predictions for the plurality of points and the respective ego motion flow estimates for the plurality of points, a respective motion prediction that indicates whether the point was static or in motion between the first time point and the second time point.

2. The method of claim 1, wherein the predicted optical flow comprises a plurality of predicted velocity vectors at a plurality of pixels, and wherein each velocity vector represents motion of corresponding pixels between the first image at the first time point and the second image at the second later time point.

3. The method of claim 1, wherein determining, from the first image and the second image, the predicted optical flow between the first image and the second image comprises generating, from the first image and the second image, the predicted optical flow using a neural network.

4. The method of claim 1, wherein determining, for each of the plurality of points from the point cloud and from the predicted optical flow between the first and second images, the respective initial flow prediction comprises:

projecting the point from the point cloud onto a corresponding pixel in the predicted optical flow; and assigning the predicted optical flow at the corresponding pixel to the initial flow prediction of the point from the point cloud.

5. The method of claim 1, wherein determining, for each of the plurality of points from the point cloud, the respective ego motion flow estimate comprises:

projecting the point from the point cloud onto a first corresponding pixel in the first image;

projecting the point from the point cloud onto a second corresponding pixel in the second image; and determining the ego motion flow estimate of the point by subtracting a position of the first corresponding pixel from a position of the second corresponding pixel.

6. The method of claim 1, wherein determining, for each of the plurality of points from the point cloud and from the respective initial flow predictions for the plurality of points and the respective ego motion flow estimates for the plurality of points, the respective motion prediction comprises:

generating respective final flow predictions for the plurality of points based at least on the initial flow prediction and the ego motion flow estimate.

7. The method of claim 6, wherein generating the respective final flow predictions for the plurality of points comprises calculating, for each point, a difference between the initial flow prediction and the ego motion flow estimate.

8. The method of claim 6, further comprising:

determining, for each of the plurality of points from the point cloud, the respective motion prediction based at least on the respective final flow predictions for the plurality of points.

9. The method of claim 1, wherein determining, for each of the plurality of points from the point cloud and from the respective initial flow predictions for the plurality of points and the respective ego motion flow estimates for the plurality of points, the respective motion prediction of the point comprises generating the respective motion prediction of the point using a neural network.

10. The method of claim 1, further comprising:

generating, from the respective motion predictions for each of the plurality of points from the point cloud, a respective object motion prediction for each of one or more objects in the scene.

11. The method of claim 10, wherein generating, from the respective motion predictions, the respective object motion prediction for each of the one or more objects in the scene comprises:

mapping the respective motion predictions for each of the plurality of points from the point cloud into a plurality of clusters, wherein each cluster comprises a plurality of points that were in motion between the first time point and the second time point; and generating, based at least on the plurality of clusters, the respective object motion prediction for each of the one or more objects in the scene.

12. A system comprising one or more computers and one or more storage devices storing instructions that when executed by the one or more computers cause the one or more computers to perform operations comprising:

obtaining a first image of a scene in an environment taken by an agent at a first time point and a second image of the scene in the environment taken by the agent at a second later time point;

obtaining a point cloud characterizing the scene in the environment, the point cloud comprising a plurality of points;

determining, from the first image and the second image, a predicted optical flow between the first image and the second image;

determining, for each of the plurality of points from the point cloud and from the predicted optical flow between the first and second images, a respective initial flow prediction for the point that represents motion of the point between the first time point and the second time point;

determining, for each of the plurality of points from the point cloud, a respective ego motion flow estimate for the point that represents a motion of the point between the first and second time points that is induced by ego motion of the agent between the first and second time points; and determining, for each of the plurality of points from the point cloud and from the respective initial flow predictions for the plurality of points and the respective ego motion flow estimates for the plurality of points, a respective motion prediction that indicates whether the point was static or in motion between the first time point and the second time point.

13. The system of claim 12, wherein the predicted optical flow comprises a plurality of predicted velocity vectors at a plurality of pixels, and wherein each velocity vector represents motion of corresponding pixels between the first image at the first time point and the second image at the second later time point.

14. The system of claim 12, wherein determining, from the first image and the second image, the predicted optical flow between the first image and the second image comprises generating, from the first image and the second image, the predicted optical flow using a neural network.

15. The system of claim 12, wherein determining, for each of the plurality of points from the point cloud and from the predicted optical flow between the first and second images, the respective initial flow prediction comprises:

projecting the point from the point cloud onto a corresponding pixel in the predicted optical flow; and assigning the predicted optical flow at the corresponding pixel to the initial flow prediction of the point from the point cloud.

16. The system of claim 12, wherein determining, for each of the plurality of points from the point cloud, the respective ego motion flow estimate comprises:

projecting the point from the point cloud onto a first corresponding pixel in the first image;

projecting the point from the point cloud onto a second corresponding pixel in the second image; and determining the ego motion flow estimate of the point by subtracting a position of the first corresponding pixel from a position of the second corresponding pixel.

17. The system of claim 12, wherein determining, for each of the plurality of points from the point cloud and from the respective initial flow predictions for the plurality of points and the respective ego motion flow estimates for the plurality of points, the respective motion prediction comprises:

generating respective final flow predictions for the plurality of points based at least on the initial flow prediction and the ego motion flow estimate.

18. The system of claim 17, wherein generating the respective final flow predictions for the plurality of points comprises calculating, for each point, a difference between the initial flow prediction and the ego motion flow estimate.

19. The system of claim 17, the operations further comprise:

determining, for each of the plurality of points from the point cloud, the respective motion prediction based at least on the respective final flow predictions for the plurality of points.

20. One or more non-transitory computer-readable storage media storing instructions that when executed by one or more computers cause the one or more computers to perform operations comprising:

obtaining a first image of a scene in an environment taken by an agent at a first time point and a second image of the scene in the environment taken by the agent at a second later time point;

obtaining a point cloud characterizing the scene in the environment, the point cloud comprising a plurality of points;

determining, from the first image and the second image, a predicted optical flow between the first image and the second image;

determining, for each of the plurality of points from the point cloud and from the predicted optical flow between the first and second images, a respective initial flow prediction for the point that represents motion of the point between the first time point and the second time point;

determining, for each of the plurality of points from the point cloud, a respective ego motion flow estimate for the point that represents a motion of the point between the first and second time points that is induced by ego motion of the agent between the first and second time points; and determining, for each of the plurality of points from the point cloud and from the respective initial flow predictions for the plurality of points and the respective ego motion flow estimates for the plurality of points, a respective motion prediction that indicates whether the point was static or in motion between the first time point and the second time point.

\* \* \* \* \*